No. 832,147. PATENTED OCT. 2, 1906.
L. F. MURPHY.
REAR LIGHT INDICATOR FOR AUTOMOBILES.
APPLICATION FILED SEPT. 5, 1905.
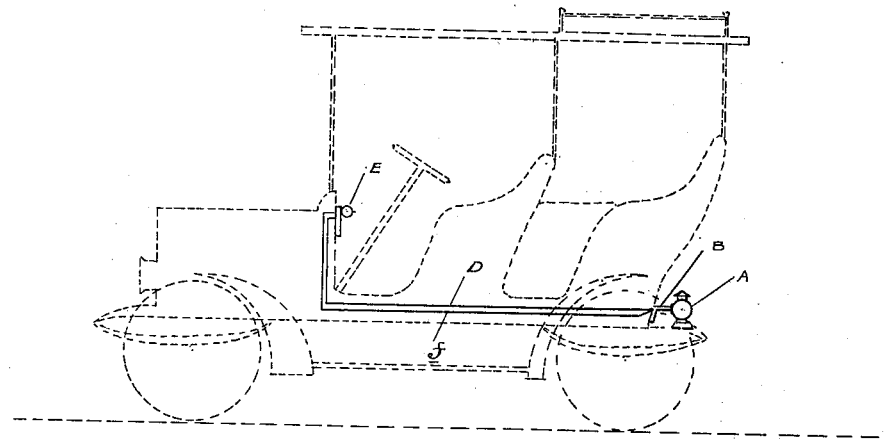
FIG.1.
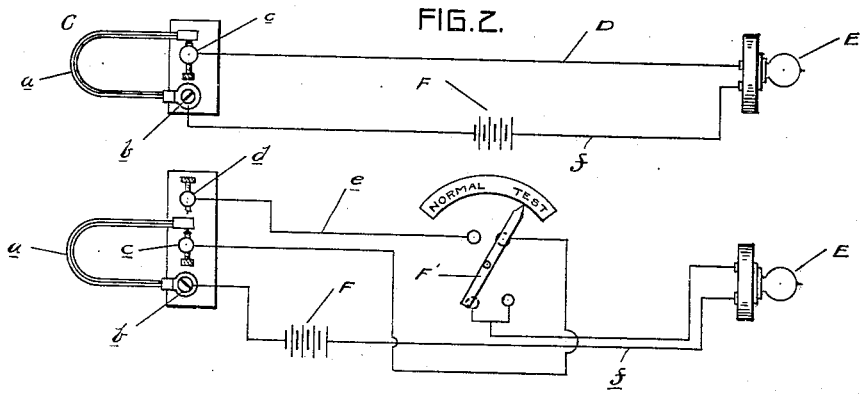
FIG.2.
FIG.3.
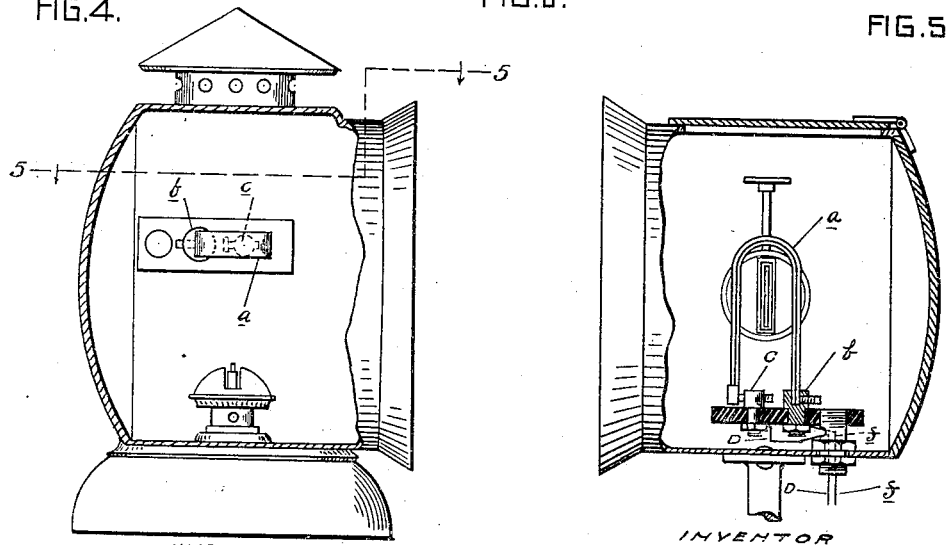
FIG.4.
FIG.5.
WITNESSES
INVENTOR
LEO·FRANCIS·MURPHY.
BY James Whittemore.
ATT'Y

UNITED STATES PATENT OFFICE.

LEO FRANCIS MURPHY, OF DETROIT, MICHIGAN.

REAR-LIGHT INDICATOR FOR AUTOMOBILES.

No. 832,147.      Specification of Letters Patent.      Patented Oct. 2, 1906.

Application filed September 5, 1905. Serial No. 277,062.

*To all whom it may concern:*

Be it known that I, LEO FRANCIS MURPHY, a citizen of the United States of America, residing at Detroit, in the county of Wayne and State of Michigan, have invented certain new and useful Improvements in Rear-Light Indicators for Automobiles, of which the following is a specification, reference being had therein to the accompanying drawings.

The invention relates to a device especially designed for use in connection with automobiles for the purpose of indicating to the driver the condition of the rear light.

The rear light, the use of which on automobiles and similar vehicles is in many places required by law, is usually so located that it is impossible for the driver to inspect the same without leaving his seat. As a consequence he is either ignorant of the condition of the lamp or it is necessary for him from time to time to leave the car to inspect the same.

It is the object of my invention to provide an indicating device that will immediately call the attention of the driver to the fact that the rear light is out and, furthermore, to provide means by which the driver may at any time test the operativeness of the indicator, as hereinafter set forth.

In the drawings, Figure 1 is a view illustrating in side elevation and in dotted lines an automobile to which my improvement is applied, the lamp, the indicating electric circuit, and the indicator being shown in full lines. Fig. 2 is a diagram of the indicating-circuit, including the thermo-electric switch and the indicating-lamp. Fig. 3 is a similar view illustrating a modification. Fig. 4 is a sectional elevation of the rear lamp with my attachment applied thereto. Fig. 5 is a section on line 5 5, Fig. 4, illustrating securing means of the thermo-electric switch to a rear lamp.

A is a rear lamp of any suitable construction, which is attached to the body of the vehicle or to other suitable support by the bracket B. The indicator which I preferably use in connection with this lamp comprises a thermo-electric switch C, included in an electric circuit D and so located in relation to the lamp A as to be influenced by the heat of said lamp when lighted.

E is the indicator for which I preferably employ a miniature electric lamp included in the electric circuit D, which is also provided with a suitable battery or other electric generator F on wire $f$.

As illustrated in Figs. 2 and 4, the switch $c$ comprises a composite bar $a$, which is formed of two metals having different coefficients of expansion, and this bar is preferably bent into the curved or return-bent form illustrated. One end of this bar is rigidly attached, as by the screw $b$, to an insulator-support upon the lamp, while the opposite end is free to move under the influence of expansion. $c$ is an electric contact which is arranged in proximity to the free end of the bar $a$, being preferably adjustable and also preferably in normal contact with said bar when the latter is not heated.

The switch C is so located in the lamp that the curved portion of the bar $a$ is subjected to the heat of the lamp when lighted and under the influence of this heat will be expanded, causing the outward movement of the free end of the bar and the separation of the same from the contact $c$. Thus when the lamp is lighted the circuit D will be broken, and the indicator-lamp E will not be illuminated. The indicator-lamp E is located at a point where it will be under the observation of the driver, preferably upon the dashboard. As a consequence if at any time the indicator-lamp is illuminated it will at once direct the attention of the driver to the fact that something is wrong with the rear light. This will be understood, as it is apparent that as long as the bar $a$ remains heated it will be separated from the contact $c$; but just as soon as the bar is cooled contraction will take place, which will close the electric circuit and cause the illumination of the indicator-lamp E.

The arrangement above described would be sufficient but for the fact that some derangement of the apparatus, such as the breaking of the electric circuit at some other point or the failure of the batteries, would render it inoperative. Thus the driver would have no assurance that the indicator was in operative condition. To avoid this difficulty, I preferably provide means for at any time testing the operativeness of the circuit, such as illustrated in Fig. 3, in which F' is a switch preferably arranged in proximity to the indicator-lamp E and under the control of the driver. $d$ is a second electric contact which is arranged upon the opposite side of the bar $a$ from the contact $c$ and is so adjusted that when the bar a is heated it would be in contact with d. e is a branch electric circuit extending from the contact d to the switch F', and this switch is preferably a "three-pole" switch, by means of which the main circuit may be closed through either that portion including the contact c or the branch e, including the contact d. The switch F' is also preferably provided with an indicator for its operating-lever, this indicating which circuit is closed in each position of adjustment. Thus if the other parts of the apparatus are arranged as previously described the driver may at any time move the switch F', whereupon if the lamp A is operating, and the bar a consequently expanded, the circuit will be closed through the contact d and branch e and the indicator-lamp E will be illuminated. If the lamp A is not operating, the circuit will be closed, and the lamp E will be illuminated when the switch F' connects poles in the main circuit. This testing-switch may also be used to cut out the indicator-lamp E when the lamp A is purposely turned out. Furthermore, whenever the lamp A is lighted any failure on the part of the operator to turn the switch F' will at once be called to his attention, as the indicator-lamp E will be illuminated and the indications in connection with the switch F', such as the words "Normal" and "Test," will show which position the switch should be turned in for normal operation. If the lamp E is illuminated when the indicator is set at "Test," the driver will know that the rear lamp is not operating. If the lamp E is not illuminated, the driver may move the indicator to "Normal," and the lamp E will then be illuminated to show that the lamp A is operating, whereas if the lamp E is not illuminated in either position of the indicator it will show that one of the circuits is out of order.

What I claim as my invention is—

1. The combination with a lamp, of a thermo-electric switch associated therewith to be operated thereby, a plurality of electric circuits controlled by said switch, an electric lamp included in said circuits, and a second switch controlling said circuits and associated with said indicator-lamp.

2. The combination with a lamp, of a thermo-electric switch associated therewith to be operated thereby, a plurality of electric circuits controlled by said switch, an electric indicator-lamp included in said circuits, and a second switch controlling said circuits for the purpose described.

3. The combination with a lamp, of a thermo-electric switch associated therewith to be operated thereby, a pair of electric circuits alternately controlled by said switch, an electric indicator-lamp included in one of said circuits, and means for indicating which circuit is closed; for the purpose described.

4. The combination with a lamp, of a thermo-electric switch associated therewith to be operated thereby, an electric circuit arranged to be closed by said switch when in one position, a second electric circuit arranged to be closed by said switch when in another position, and means for indicating which circuit is closed.

In testimony whereof I affix my signature in presence of two witnesses.

LEO FRANCIS MURPHY.

Witnesses:
JAMES P. BARRY,
EDWARD D. AULT.